UNITED STATES PATENT OFFICE.

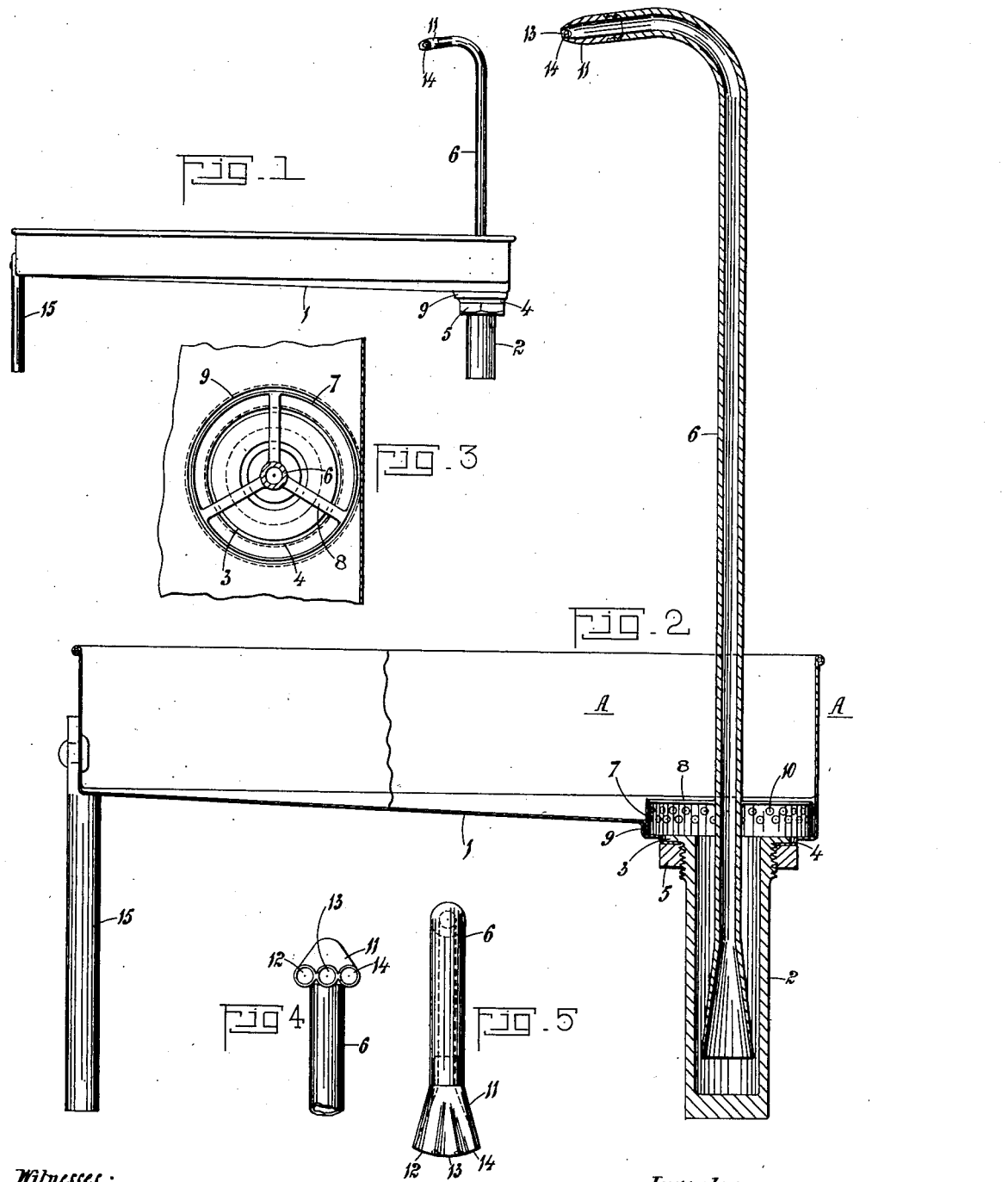

ARTHUR GEORGE RICH WILLIAMS, OF CAMBRIDGE, WAIKATO, NEW ZEALAND.

BASTING APPARATUS.

No. 814,255.

Specification of Letters Patent.

Patented March 6, 1906.

Application filed January 30, 1905. Serial No. 243,398.

*To all whom it may concern:*

Be it known that I, ARTHUR GEORGE RICH WILLIAMS, a subject of His Majesty the King of Great Britain and Ireland, residing at Rothsay, William street, Cambridge, Waikato, in the Provincial District of Auckland, in the Colony of New Zealand, have invented certain new and useful Improvements in Basting Apparatus, of which the following is a specification.

This invention relates to the cooking of meat, poultry, and the like, and provides apparatus for basting the same during the cooking process.

According hereto the baking-dish is provided with a depending well, and in this well is placed the lower end of a tube which extends upwardly and has its upper end bent to project over the top of the meat. The lower end of the tube is conical, and the upper end of the tube is provided with a nozzle. When the apparatus becomes hot in the oven, fat rises up the tube and is discharged through the nozzle upon the meat.

Referring to the accompanying drawings, Figure 1 is a side elevation. Fig. 2 is to a larger scale and is a central sectional elevation. Fig. 3 is a sectional plan on A A, Fig. 2; Fig. 4, a front elevation of the nozzle, and Fig. 5 a corresponding plan.

The bottom 1 of the baking-dish inclines toward the cylindrical well 2, which is closed at its lower end, has a flange 3 at its upper end fitting a recess 4 in the dish, and is screw-threaded to receive a back-nut 5, by which it is clamped in position. The vertical tube 6 is conical at its lower end, which is placed within the well 2, the bottom of the cone being a short distance from the bottom of the well. A ring 7, connected to the tube by arms 8, fits a recess 9 in the bottom of the baking-dish, said ring projecting above the recess and having perforations 10, through which liquid from the dish flows down into the well. The upper end of the tube is bent approximately at right angles and has a nozzle 11 screwed upon its end, said nozzle having three spray-openings 12, 13, and 14. As many spray-openings can be used as desired. Legs 15 and 16 support the dish at the end opposite to the well.

I find in practice that good results are obtained by making the height of that portion of the tube which projects above the bottom of the baking-dish three times the depth of the well. If desired, more than one tube and well can be used, the dish being constructed to cause liquid to flow into the wells.

In operation the basting-fat is placed in the bottom of the baking-dish and sufficient water to leave a small quantity upon the bottom of the baking-dish after filling the well. The baking-dish is then placed in the oven. As the water and fat become heated the fat rises up the tube and is projected through the nozzle upon the meat. The water is turned into vapor by the heat of the oven, and the expansion of the water into vapor forces fat floating above the water up the tube and distributes it upon the meat.

Having now particularly described and ascertained the nature of my said invention and in what manner the same is to be performed, I declare that what I claim is—

Apparatus for the purpose indicated, comprising in combination, a baking-dish, a tubular well closed at its lower end and having a flange upon its upper end, said flange fitting a recess in the bottom of the baking-dish, a back-nut screwing upon the well, a tube having a conical lower end, a nozzle upon the upper end of said tube, a ring surrounding the tube and arms connecting the tube with the ring, said ring being perforated and adapted to fit a recess in said dish and being so arranged in relation to the tube that the tube is supported with its lower end above the bottom of the well, substantially as specified herein and illustrated.

In testimony whereof I have signed my name to this specification in the presence of two witnesses.

ARTHUR GEORGE RICH WILLIAMS.

Witnesses:
R. S. BALDWIN,
I. I. WATSON.